April 1, 1930.   S. A. F. JOHANSSON ET AL   1,753,118
CONTROLLING PRESSURE GAUGE
Filed July 20, 1927
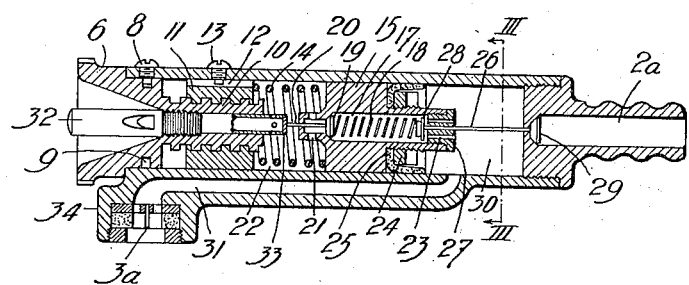
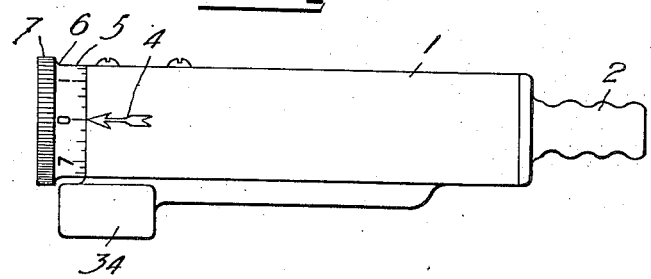
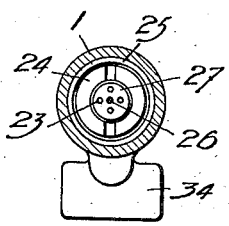
Inventors,
Sven A. F. Johansson,
Arvid O. Dahlstrom,
by their Attorneys,
Howson & Howson Patented Apr. 1, 1930

1,753,118

UNITED STATES PATENT OFFICE

SVEN A. F. JOHANSSON AND ARVID O. DAHLSTRÖM, OF STOCKHOLM, SWEDEN

CONTROLLING PRESSURE GAUGE

Application filed July 20, 1927, Serial No. 207,236, and in Sweden April 23, 1927.

This invention relates to a device comprising in combination a pressure gauge and a filling valve, and adapted to be applied to the end of an air line and engage the usual valve stem of a pneumatic tire for filling purposes.

The object of the invention is to provide means for preventing over-inflation and controlling the pressure created in the tire during inflation with an accuracy that has not hitherto been possible to attain with known gauges. According to the invention the pressure gauge is connected with the filling valve and controls the movements of the latter.

For a full understanding of the invention reference is had to the following description and accompanying drawings disclosing a preferred embodiment of the invention. In the drawings:

Fig. 1 is a longitudinal sectional view of the device and

Fig. 2 is a side elevation thereof.

Fig. 3 is a detail view in a transverse section on line 3—3 of Fig. 1.

Corresponding and like parts are referred to in the following description and indicated in all the views of the drawings by the same reference characters.

Referring to the drawing 1 represents the tubular body of the gauge. A connecting piece 2 is threaded into the body at one end, said piece having a central bore 2ª through which the interior of the body can communicate with a tube or hose leading from a pump or any container of air under pressure. On the drawing the member 2 is formed as a hose connection. 34 is the connection to the tire as usual formed with a pin 3ª adapted to depress the spindle of the tire-valve. On the end opposite to the connecting piece 2 the body 1 bears a mark, in the shape of an arrow 4, and adapted to register with a scale 5 provided on a member 6 having a knurled head 7 and capable of being rotated relatively to the body 1. The member 6 is inserted into the tubular body 1 and held to the body by suitable means as a screw 8 threaded through the walls of the body 1, the end of said screw entering a peripheral groove 9 formed in the member 6, the member 6 thus being rotatingly but not slidingly connected to the body 1.

The inward portion 10 of the member 6 is of a cylindrical shape and provided with a screw-threaded part engaging with a cylinder 11 which by suitable means as the longitudinal groove 12 provided therein and the screw 13 threaded through the wall of the body 1 is arranged so as to be capable of sliding longitudinally within but not of rotating relatively to the body 1. The cylinder 11 forms an abutment for one end of a helical spring 14, the other end of said spring abutting against a piston 15 also located within the body 1. The piston 15 has a central bore 17 in which a helical spring 18 is located. One end of said spring abuts against a valve head 19 provided on a valve spindle 20. Normally said valve head 19 under the action of the spring 18 shuts off communication between the bore 17 and the chamber 22 in the body 1 in which the spring 14 is located, whereas, when the valve 19 is opened the chamber 17 communicates with the chamber 22 through the openings 21. At the other end of the bore 17 a bushing 23 is provided having a central opening to accommodate a spindle 26, air-passages 27 extending lengthwise through the bushing. The spindle 26 on one end carries a head 28 against which abuts the other end of the spring 18. The piston 15 is provided with a gland 24 and a packing 25 by which it forms a tight joint with the inside of the body 1. On its other end the spindle 26 bears a conical valve head 29. The chamber 30 between the piston 15 and the connecting piece 2 communicates through the passage 31 with the bore in the connecting piece 34. The member 6 has a central bore in which is inserted a tube 32 which preferably forms a whistle. The tube 32 is closed at its inner end 33, apertures being provided in the side walls near to said inner end. On a portion of its length the whistle is externally screw-threaded engaging a correspondingly screw-threaded part of the boring of the member 6 by which arrangement it has been made possible to adjustably locate the closed inner end 33 of the tube 32 relatively to the valve spindle 20.

The operation of the device is as follows: By rotating the member 6 the desired numeral of the scale 5 denoting the pressure to be obtained is made to register with the arrow 4. The rotation of the member 6 causes the cylinder 11 to be displaced axially under the action of the screw-threaded portion 10 of the member 6. The pressure of the spring 14 causes the piston 15 to be moved also a corresponding distance and, the spring 18 urging the head 28 of the spindle 26 against the bushing 23, the spindle 26 and its valve head 29 also move in the same direction. The valve head 29 will be more or less removed from its seat and direct communication established between the bore 2$^a$ and the interior of the tire through the chamber 30 and the passage 31. As the pressure within the tire and, consequently, that in the chamber 30 which communicates with the interior of the tire rises, the head 28 is moved away from the inner end of the bushing 23, against the pressure of the spring 18, by the air passing into the openings 27 in said bushing, permitting air to pass through the openings 27 into the bore 17 of the piston 15, the piston 15 is forced outwards compressing the spring 14 and throttling the passage past the valve 29.

In order to call attention to the fact that the required pressure has been attained the device preferably comprises a signal device consisting of the abovementioned whistle 32. The chamber 30 through the apertures 27 communicates with the bore 17 of the piston 15, but the latter normally is shut off from communication with the chamber 22. As the piston 15 is moved outwards, however, the end of the spindle 20 will finally abut against the inner end of the whistle 32. Further movement of the piston 15 will cause the valve 19 to be opened and air will escape from the bore 17 through the holes 21 into the chamber 22 and from there through the whistle 32 sounding it. By screwing the whistle 32 forth or back within the cylinder 10 its position relatively to the spindle 20 can be adjusted in such a manner as to have the whistle sounded at the exact moment at which the desired pressure is attained. The valve 29 should then be almost closed, allowing only such a quantity of air to pass through it as will be required for sounding the whistle.

We claim:

A pressure controlling gauge having a body and an air inlet and an air outlet, a valve controlling said inlet, a piston having a bore and air passage opening into said bore from the opposite ends of said piston, a spring having one end engaging said piston, an internally threaded cylinder engaging the opposite end of said spring, a regulating element rotatably mounted in one end of said body, a threaded extension on said regulating element cooperating with said threaded cylinder, a valve in each end of said piston bore normally closing said air passages, a spring extending between said valves for seating the same, a spindle connecting one of said piston valves with said inlet valve, a stem on the second of said piston valves projecting from said piston, and a whistle in said regulating element having a projecting end adapted to engage the said stem of said second piston valve and unseat the same when the pressure in said body rises to a predetermined point and moves said piston against the action of the spring engaging the one end of the piston, said inlet valve being thereby moved to permit only a negligible amount of air to enter said bore and operate said whistle.

In testimony whereof, we have signed our names to this specification at Stockholm this 30th day of June 1927.

SVEN A. F. JOHANSSON.
ARVID O. DAHLSTRÖM.